March 17, 1931. PIERRE DIT GASTON BAQUEY 1,796,499
FACE POWDER DEVICE PROVIDING FOR A GRADUAL FEED OF THE POWDER
Filed Dec. 4, 1928
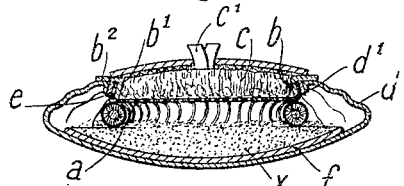
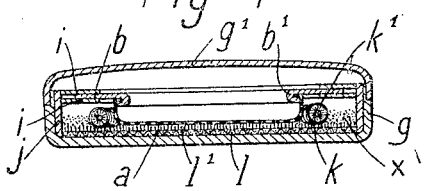
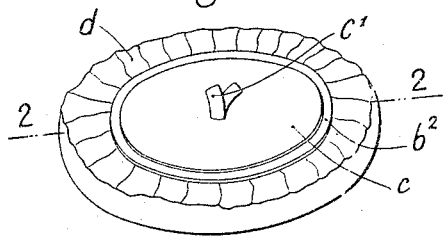
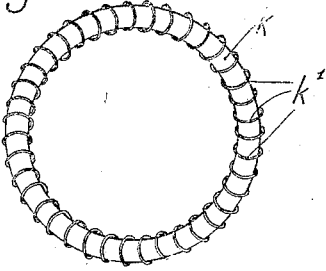
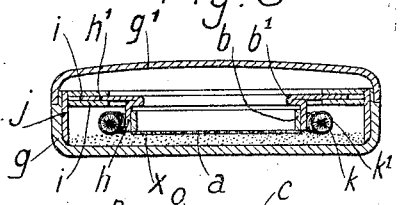
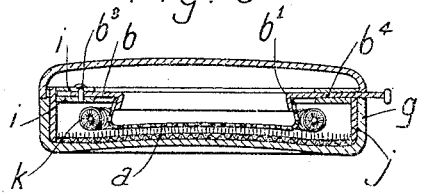
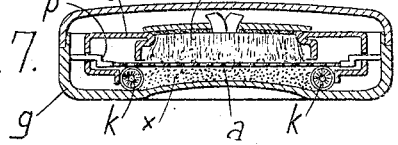
Pierre called Gaston Baquey
INVENTOR
By: Marks & Clerk
Attys.

Patented Mar. 17, 1931

1,796,499

UNITED STATES PATENT OFFICE

PIERRE (DIT) GASTON BAQUEY, OF COLOMBES, FRANCE

FACE-POWDER DEVICE PROVIDING FOR A GRADUAL FEED OF THE POWDER

Application filed December 4, 1928, Serial No. 323,683, and in Luxemburg December 14, 1927.

The present invention relates to a face powder device providing for a general feed of the powder, without requiring the use of a spring.

The said powder device comprises a powder receptacle in which is mounted a movable frame adapted for housing the powder puff and a sieve, actuated by the said powder puff which is applied on said sieve, integral with the movable frame or receptacle, means being provided for the automatic repartition of powder on the whole surface of said sieve.

For example, the said sieve may be movable with reference to the end part of the powder device, and mounted on the frame so as to move forward against the powder substance when it is worn down, and the said sieve may move with it one or more brushes of suitable material, such as cloth with upright fibres, for instance the round plush pieces used for fancy trimming, and said brush or brushes, preferably protected and strengthened by fibres or wires suitably combined therewith, are so disposed as to be moved forward by the said sieve, in the frictional movements of the latter, so as to disaggregate the powder and to sweep it upon the said sieve.

Furthermore, the said sieve may be placed in constant contact with a rough surface, for instance a striated substance, or a substance with upright fibres directed towards the sieve, such as velvet, plush, or a short and fine brush or the like, which rough surface is adapted to feed to the sieve the material which it receives by suitable means.

The sieve may also be integral with the receptacle and the movable frame on which the powder puff is housed may act only the brushes distributing powder.

The device according to the invention requires no spring to bring the powder substance into contact with the sieve, which is an advantage.

The invention is further characterized by the general and detail dispositions comprised in the embodiments shown by way of example in the accompanying drawings:

Fig. 1 is a perspective view of a powder device according to the invention.

Fig. 2 is a middle transverse section on the line 2—2 of Fig. 1.

Figs. 3 and 4 are like sectional views relative to two modifications, with the powder puffs removed.

Fig. 5 is a plan view of an annular brush.

Fig. 6 is a sectional view of a sieve device.

Fig. 7 shows an embodiment in which the sieve is stationary.

In all of the examples of Figs. 1 to 7, the sieve $a$ consists of suitable material such as cloth, stretched or flexible, a perforated plate, wire gauze or the like. The edges of said sieve are fitted by any suitable means such as binding, crimping, cementing, soldering or the like, upon a frame $b$ of a suitable substance. An annular projection $b^1$ is formed on the frame $b$ itself (Figs. 1, 2, 4, 6) or upon the member which supports and surrounds the said frame (Fig. 3). The said projection $b^1$ serves to insert the powder puff $c$ (Fig. 1) into the sieve and to prevent the said puff from being accidentally drawn out of the sieve, the lower part of the puff being caused to project slightly, to this effect.

As shown in Fig. 1, the powder device consists of a sack $d$ of a suitable flexible substance such as closely woven cloth, india rubber, leather or the like. The edges $d^1$ of the mouth of said sack are secured by cementing, binding or like means, to a circular ring which can expand by suitable means, for instance by its own elasticity, a gap, or the like, so as to sufficiently and removably hold the lateral wall of the frame $b$ of the sieve in the said ring $e$. In this example the ring has a tapered shape so as to fit upon and to secure the frame $b$ itself, which frame is extended by a circular ring $b^2$. There may be optionally employed a rigid end part F of cardboard or the like in order to cover the end of the sack $d$, so that the said sack may be more readily seized by the hand.

To employ the said device, the sieve $a$ is rubbed upon the powder $x$, due to the flexible nature of the sack and to a suitable movement which is given to the puff $c$ cooperating with the sieve. This friction causes the pulvurent material to pass through the sieve, and it at once settles below the powder puff.

In order to bring the said material under the sieve $a$, an annular brush $k$, of plush or other material, surrounded by a copper wire $k^1$ (Fig. 5), is placed around the sieve and follows its side motions, thus sweeping in the powder and bringing it under the sieve.

As shown in Fig. 3, the powder device consists of a rigid box $g$ provided with a cover $g^1$, of any kind. The frame $b$ of the sieve $a$ is vertically slidable in a ring $h$ whose upper part when inwardly folded, then upwardly and outwardly will form a flange $h^1$, and a shoulder $b^1$ which limits the upward displacement of the ring $b$. The flange $h^1$ is freely engaged between two other annular flanges $i$ of larger diameter which are secured to a ring $j$ fitted into the box $g$. The ring $h$—$h^1$ and the sieve $a$ may thus, due to the powder puff (not shown), be given the proper movements, the ring $h^1$ sliding between the rings $i$ which serve as guides, while preventing the exit of the powder $x$ contained in the end part of the box $g$. The said sieve operates as specified in the preceding example, and the sieve descends in the ring $h$ according to the wear of the powder substance.

In the example shown in Fig. 4, the sieve $a$ is held by its upper edges between the bent inner edges of a circular ring which forms the frame $b$. The said frame $b$ is slidable between two annular parts $i$ which are disposed as in the preceding example. A brush $k$ surrounds the said sieve. The end part of the box $g$ is faced with a cloth member $l$ with straightened fibres $l^1$ which are in constant contact with the sieve. The powder $x$ is disposed in the peripheral part of the box.

To use the device, the sieve is rubbed by various movements exercised upon the powder puff (not shown) which is in place in the sieve. In the example shown in Fig. 4, the fibres $l^1$ of the cloth $l$ will facilitate this operation, and will also force the powder through the sieve $a$.

As shown in Fig. 6, the frame $b$ of the sieve is pivoted on an axle $b^3$ traversing the rings $i$. A projecting arm $b^4$ secured to said frame and traversing the ring $j$ and the box $g$ through a circular aperture, allows the sieve $a$ to be actuated. The end of the box is either concave or convex.

In Fig. 7, the powder-puff C is fitted in a frame $o$ provided on its periphery with slots through which pass pins $p$ integral with the receptacle; therefore said frame is able to be slightly moved relatively to said receptacle.

Said frame controls as herein before specified a brush $k$ that brings back the powder towards the sieve $a$; this latter is stationary and secured to the pins $p$.

It is obvious that various other constructions embodying the features of the invention may be employed. For example the powder receptacles shown in Figs. 2 to 7 may be comprised in a pocket having the form of a handkerchief.

The forms and the accessory arrangements of the several parts of the aforesaid device, as well as the dimensions, material, details, and means of construction, may be varied without departing from the spirit of the invention.

Claims:

1. In a powder device adapted for the gradual feed of powder, the combination of a box containing a powder compartment, a sieve disposed in the said box, a powder puff adapted to rub against the said sieve, an annular brush disposed within the powder compartment, and means for transmitting to the said annular brush the movements of the powder puff when the latter is rubbed against the said sieve.

2. In a powder device adapted for the gradual feed of powder, the combination of a box containing a powder compartment, a sieve in the said box, a powder puff adapted to rub against the said sieve, an annular brush disposed within the powder compartment, the said annular brush being movable in all directions in the box and means for transmitting to the said brush the movements in all directions of the said powder puff when the latter is rubbed against the said sieve.

3. In a powder device adapted for the gradual feed of powder, the combination of a box containing a powder compartment, a sieve in the said box, a powder puff adapted to rub against the said sieve, an annular brush disposed within the said powder compartment, a frame adapted to move in the said box and to which the said sieve is secured, a guide in which the said frame slides parallel to the bottom of the said box, the said brush being disposed around the said frame.

4. In a powder device adapted for the gradual feed of powder, the combination of a box containing a powder compartment, a sieve in the said box, a powder puff adapted to rub against the said sieve, an annular brush disposed within the powder compartment, a frame adapted to move in the said box and means for transmitting to the said brush the movements of the said powder puff when the same is rubbed against the said sieve.

In testimony whereof I have hereunto affixed my signautre.

PIERRE (DIT) GASTON BAQUEY.